United States Patent [19]

Zona et al.

[11] Patent Number: 5,181,591
[45] Date of Patent: Jan. 26, 1993

[54] ARRANGEMENT FOR THE ELECTRICAL CABLES OF AN ARTICULATED ROBOT ARM

[75] Inventors: Mauro Zona; Marco Bettinardi, both of Turin, Italy

[73] Assignee: Comau SpA, Turin, Italy

[21] Appl. No.: 770,279

[22] Filed: Oct. 3, 1991

[30] Foreign Application Priority Data

Oct. 4, 1990 [IT] Italy ................... 67761 A/90

[51] Int. Cl.⁵ ........................................... H02G 11/00
[52] U.S. Cl. ............................. 191/12 R; 414/744.5; 414/918; 901/23
[58] Field of Search ............... 433/25, 53, 103, 108, 433/109; 191/12 R, 12 C, 1 R; 414/744.2, 744.5, 918; 901/23, 24, 38, 41, 42, 43, 15

[56] References Cited

U.S. PATENT DOCUMENTS

| | | | |
|---|---|---|---|
| 2,205,665 | 6/1940 | Peters | 191/12 R |
| 2,607,863 | 8/1952 | MacFarland | 191/12.2 R |
| 3,548,122 | 12/1970 | Hay | 191/12 R |
| 3,819,880 | 6/1974 | Johnston | 191/12 R |
| 3,867,590 | 2/1975 | Gasser | 191/12 R |
| 4,095,752 | 6/1978 | Pomeret et al. | 414/744.2 |
| 4,378,959 | 4/1983 | Susnjara | |
| 4,392,776 | 7/1983 | Shum | 414/744.5 |
| 4,632,632 | 12/1986 | Simone | |
| 4,667,460 | 5/1987 | Kramer | 191/12 R X |
| 4,830,569 | 5/1989 | Jannborg | 901/41 X |
| 5,025,126 | 6/1991 | Hansen | 414/744.2 X |

FOREIGN PATENT DOCUMENTS

| | | |
|---|---|---|
| 3410637 | 10/1985 | Fed. Rep. of Germany . |
| 3628446 | 2/1988 | Fed. Rep. of Germany . |
| 60-11788 | 1/1985 | Japan . |
| 1-177990 | 7/1989 | Japan ............. 414/744.5 |
| WO8702612 | 5/1987 | PCT Int'l Appl. . |
| 483184 | 1/1970 | Switzerland . |
| 797338 | 7/1958 | United Kingdom ........ 433/108 |

OTHER PUBLICATIONS

IBM technical disclosure, "IBM 7535 Manufacturing System," Nov. 1983.
IBM technical disclosure, "IBM 7540 Manufacturing System," Nov. 1983.
IBM technical disclosure, "IBM 7545 Manufacturing System," Jan. 1984.
IBM technical disclosure, "IBM 7547 Manufacturing System," Apr. 1984.

*Primary Examiner*—Michael S. Huppert
*Assistant Examiner*—Scott L. Lowe
*Attorney, Agent, or Firm*—Sughrue, Mion, Zinn, Macpeak & Seas

[57] ABSTRACT

Two electrical cables of an articulated robot arm are in the form of helical cords which lengthen and shorten respectively during the rotation of the arm.

2 Claims, 2 Drawing Sheets

ARRANGEMENT FOR THE ELECTRICAL CABLES OF AN ARTICULATED ROBOT ARM

BACKGROUND OF THE INVENTION

The present invention relates to articulated industrial robots and, in particular, to an arrangement for the electrical cables of an articulated robot arm.

A problem which has to be confronted by the designers of articulated robots is the provision of guide means for the electrical supply cables of the electric motors for rotating the various arms of the robot. These cables must be guided through the mutual articulations of the various robot arms without the risk of the cables being twisted as a result of the rotations of the arms.

SUMMARY OF THE INVENTION

In order to resolve this problem effectively, the subject of the present invention is an articulated robot including at least one robot arm the ends of which are articulated respectively to a support structure and to a further movable member, in which at least two electrical cables extend through the arm to connect stationary electrical supply means to electrical equipment in the further movable member, characterised in that the electrical cables are constituted by two resiliently-extensible helical cords arranged longitudinally along two sides of the arm in a plane substantially perpendicular to the axes of articulation of the ends of the arm, each of the helical cords having one end portion fixed to the support structure on which the arm is rotatable and its opposite end portion fixed to the corresponding end of the arm so that any rotation of the arm relative to its support structure lengthens one of the two cords and shortens the other correspondingly.

BRIEF DESCRIPTION OF THE DRAWINGS

The invention will now be described with reference to the appended drawings, provided purely by way of non-limiting example, in which.

DETAILED DESCRIPTION OF THE INVENTION

Figure 1:
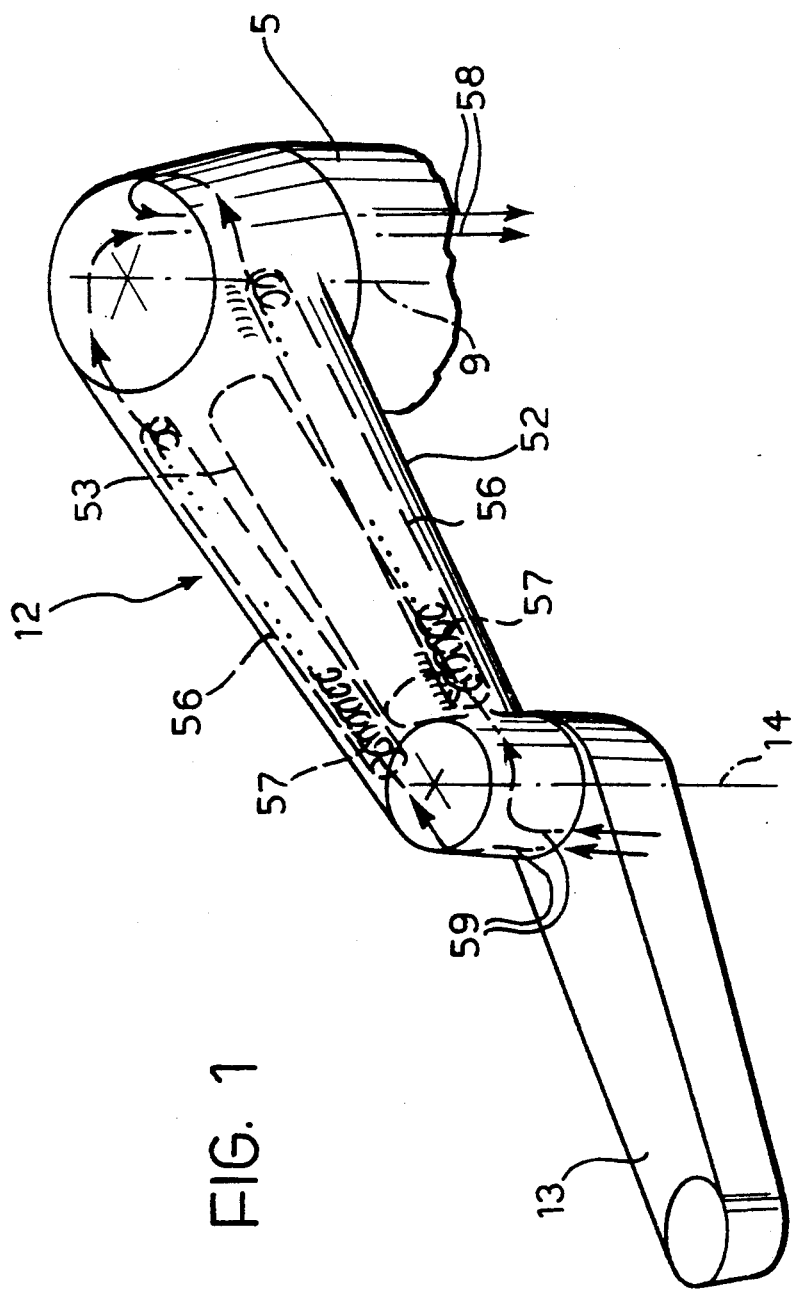
FIG. 1 is a schematic perspective view of a robot arm according to the invention.

With reference to FIG. 1, a robot arm, indicated 12, has a casing 52 (shown only in broken outline) in the form of a shell-like structure which performs a load-bearing function and houses a disconnectible module 53 (also shown only in broken outline) housing the drive unit and its mechanical transmission for moving a further movable member (for example, a robot forearm) which is articulated to the left-hand end of the arm 12 (with reference to FIG. 1).

The structure of the robot arm described above with a casing in the form of a shell-like structure which performs a load-bearing function and a separable internal module which includes the motor and its mechanical transmission, is the subject of a copending patent application by the same Applicant.

Two tubular protective elements 56 extend along the two longitudinal sides of the arm 12 and house two electrical cables 57 in the form of resiliently-extensible, helical cords whose ends are connected respectively to cables 58 leading from a base structure 5 of the robot at one end and to cables 59 leading to the electric motors on the forearm (not shown) at the other end. The arrangement of the cables 56 in the manner indicated above is a particularly simple and effective solution to the problem of avoiding any twisting of the cables at the axis 9 of the arm 12 to the element 5 of the robot. The two helical cords 57 are fixed at one end to the cables 58. Their opposite ends 59, however, are connected to the structure of the arm 12. The two helical cords 57 are in a plane which is normal to the axis 9 and to the axis 14.

Figure 4:
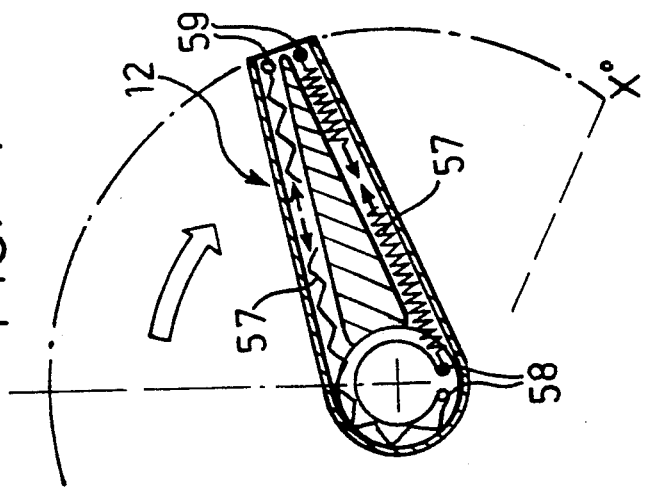
FIGS. 2, 3 and 4 show schematically and in plan three different operating conditions of the arm of FIG. 1.
Figure 3:
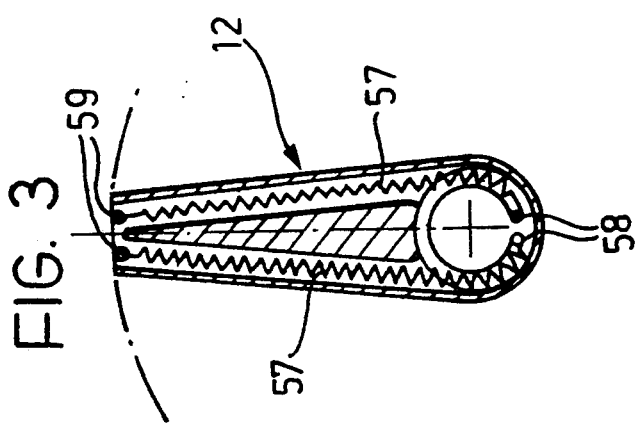
Figure 2:
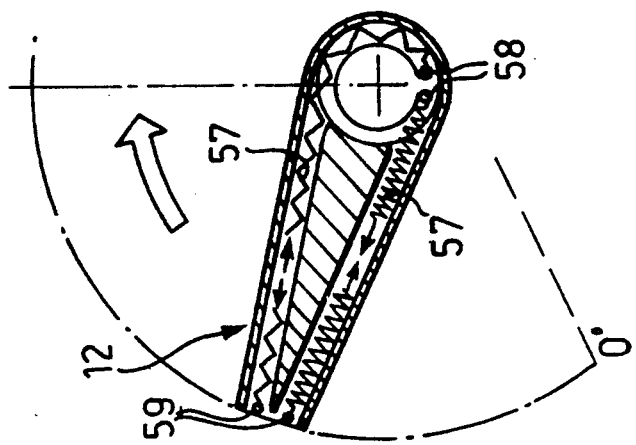

As a result of this arrangement, rotations of the arm 12 about the axis 9 lengthen or shorten each helical cord. FIGS. 2, 3 and 4 show this deformation schematically. FIG. 3 shows the arm 12 in an intermediate position in which the lengths of the two cords 57 are identical. FIGS. 2 and 4 show the arm pivoted to two positions on opposite sides of the intermediate position of FIG. 3 which correspond to the shortening of one of the two cords 57 and the lengthening of the other.

Naturally, the principle of the invention remaining the same, the details of construction and forms of embodiment may be varied widely with respect to those described and illustrated purely by way of example, without thereby departing from the scope of the present invention.

What is claimed is:

1. An articulated robot having stationary electrical supply means, said robot comprising at least one robot arm articulated at one end to a support structure and at its other end to a further movable member carrying electrical equipment, and at least two electrical cables which extend through the arm to connect the stationary electrical supply means to the electrical equipment in the further movable member, wherein the electrical cables are constituted by two resiliently-extensible helical cords arranged longitudinally along two sides of the arm in a plane substantially perpendicular to the axes of articulation of the ends of the arm, each of the helical cords having one end portion fixed to the support structure on which the arm is rotatable and its opposite end portion fixed to the corresponding end of the arm so that any rotation of the arm relative to its support structure lengthens one of the two cords and shortens the other cord correspondingly.

2. An articulated robot according to claim 1, wherein each helical cord has a tubular protective guide sheath.

* * * * *